April 12, 1949.    F. W. SLATER    2,467,276
CUSHIONING DEVICE FOR CARRIAGE SLIDES OF
SCREW MACHINES OR THE LIKE
Filed Feb. 6, 1946

Inventor
Frederick W. Slater
By Rockwell & Bartholow
Attorneys

Patented Apr. 12, 1949

2,467,276

UNITED STATES PATENT OFFICE 2,467,276

CUSHIONING DEVICE FOR CARRIAGE SLIDES OF SCREW MACHINES OR THE LIKE

Frederick W. Slater, West Haven, Conn., assignor to James E. Murphy, New Haven, Conn.

Application February 6, 1946, Serial No. 645,740

8 Claims. (Cl. 267—75)

This invention relates to a cushioning device for carriage slides for screw machines or the like, and more particularly to a device for cushioning the carriage or slide of a machine tool upon the return of the slide after it has been advanced toward the work. As illustrated, the device is applied to a screw machine in which the slide or carriage carries the tools which are advanced to be engaged with the work, but it will be understood that it is not limited to a device of this character.

In the usual screw machine now in use, for example, the carriage upon which the tools are mounted is in the form of a slide movably mounted upon the bed of the machine, the slide being advanced to engage the tools with the work by a cam or some other positive means and returned by a spring. The carriage slide is normally provided with a pin extending through a slot in the bed, which pin projects into a recess in the return plunger upon which the return spring acts. If this pin is permitted forcibly to strike against the edge of the slot in which it works upon the return of the slide by the return spring, the pin is apt to be sheared off, thus necessitating shutdown and repair of the machine.

In the past, bumpers or cushioning means have been provided to prevent the engagement of the pin with the end of the slot in which it moves, but for various reasons these devices have not been effective. Such devices have usually consisted of a piston and cylinder in the nature of a dashpot arrangement, the piston compressing the air before it is driven into the cylinder by the return of the slide. However, if for any reason the packing on the piston wears or the air leaks from the cylinder for any other reason, the return of the piston is sufficiently forcible to carry the pin to the edge of the slot with a result that breakage occurs. Moreover, it is difficult when employing an air cylinder to so control the air that the piston will stop at the right point to give the carriage slide a sufficient stroke and, at the same time, prevent the pin from striking the edge of the slot.

By the present invention, I contemplate providing a cushioning device which will always stop the carriage slide upon the return of the carriage before the pin reaches the edge of the slot and, at the same time, providing a cushioning effect so that the checking of the movement of the slide will not be so abrupt as to cause strain on any of the parts.

One object of the present invention is to provide a new and improved cushioning device for carriage slides for screw machines or like devices.

A further object of the invention is to provide a cushioning device consisting of a piston and cylinder so arranged as to cushion the return of a carriage slide of a screw machine or like device and arranged to cooperate with the plunger upon which acts the return spring which effects the return of the slide.

A still further object of the invention is to provide a cushioning device of the character described, which device will comprise a piston and cylinder, the cylinder containing some suitable liquid, such as oil, to act as a seal and to serve to check the entrance of the piston into the cylinder.

To these and other ends the invention consists in the novel features and combinations of parts to be hereinafter described and claimed.

Figure 1:
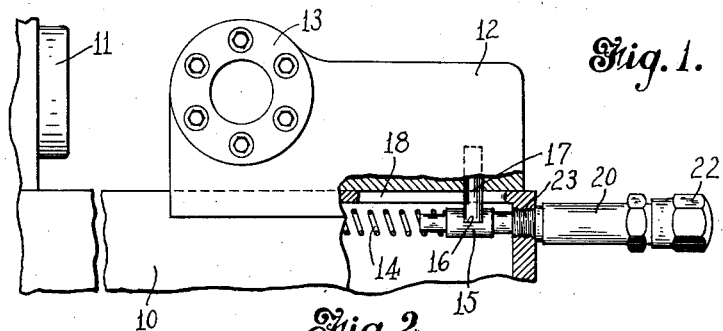
Fig. 1 is a diagrammatic view of a portion of a machine tool, such as a screw machine, showing the application of my invention thereto.

To illustrate a preferred embodiment of my invention, I have shown in Fig. 1 of the drawing a machine tool, such as a screw machine, for example, having a bed 10, a workholder or chuck 11, and a carriage slide 12 slidably mounted upon the bed. Upon the carriage slide 12 is supported the turret or tool holder 13 which carries the tools to be engaged with the work (not shown) held in the workholder 11.

The slide 12 may be moved toward the work or to the left, as shown in Fig. 1, by any suitable means (not shown), the means employed in connection with screw machines usually being a rotating cam which serves to advance the slide toward the workholder and which, at the point of furthest advance, releases the slide so that it may return freely to its original position. The return of the slide is effected as shown by a return spring 14 which acts upon a return plunger 15, this plunger being provided with a keyway or recess 16 which receives the end of a pin 17 secured to the slide. The pin 17 projects through a slot 18 in the base upon which the slide is mounted and, as will be apparent, the action of the spring 14 against the plunger 15 would carry the slide to the right a sufficient distance to cause the pin 17 to strike against the right-hand end of the slot 18 unless this action were prevented.

In stopping the action of the slide or the plunger 15, it is necessary to employ a cushioning device, and if the return plunger 15, for example, were checked too suddenly the end of the pin 17 might shear off in the keyway 16.

In order to provide a suitable cushioning device, I have shown a cylinder 20 having a chamber 21 closed by a cap 22, the cylinder being connected to the bed 10 by a threaded neck or collar 23, this collar having a passage therethrough to receive the reduced end 24 of the spring plunger 15.

The portion 24 of the spring plunger is hollow, as shown at 25, and is adapted to telescope over the stem 26 of a piston 27 within the cylinder, the piston being provided with a suitable packing cup or washer 28. Also, between the piston and the end of the cap 22 there is mounted a relatively light spring 29 which normally acts to move the piston toward the left, as shown in the drawings, and will thus normally keep the pressures equalized on both sides of the piston, the spring overcoming the friction between the packing cup and the cylinder wall.

Figure 4:
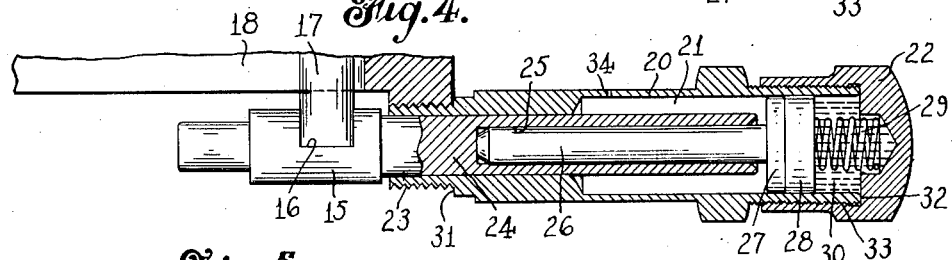

In order to insure that the pin 17 will not strike the end of the slot 18 in the bed 10, a quantity of liquid, such as oil, is placed within the cylinder between the piston 27 and cap 22, as shown at 30, this quantity of oil being sufficient so that the piston will be checked in substantially the position shown in Fig. 4, even though there may be little or no air remaining within the cylinder due to leakage or for other reasons. The cylinder may be filled with oil by removal of the cap 22 and the positioning of the piston in substantially the position shown in Fig. 4. In order to determine the position of the piston a measurement is taken between the center of the slot or recess 16 and the shoulder 31 when the plunger 15 is in such a position that the pin is spaced from the right-hand edge of the slot 18. In this position, the cylinder is filled with oil above the piston, and the cap 20 is screwed down almost to its final position, that is, within two or three threads of its final position. The piston 27 is then advanced by movement of the plunger 15 until all of the air is forced from within the cylinder and oil begins to be forced out around the threads of the cap 22. The cap 22 is then tightened down to its final position in which the end of the cylinder bottoms against the end of the cap, as shown at 32. The threads 33 by which the cap is threaded onto the cylinder will preferably be quite fine, so that a substantially airtight joint between the cap and the cylinder will result. Also, the cylinder 22 may be provided with a small vent or bleed opening 34 rearwardly of the piston 27 in order to prevent air building up rearwardly of the piston 27 by movement of the portion 24 of the plunger and permitting air to enter this portion of the cylinder so as to pass into that portion in which the oil is contained when the plunger moves to the left under the force of the spring 29 and the force of the pressure within the cylinder forwardly of the piston.

Figure 3:
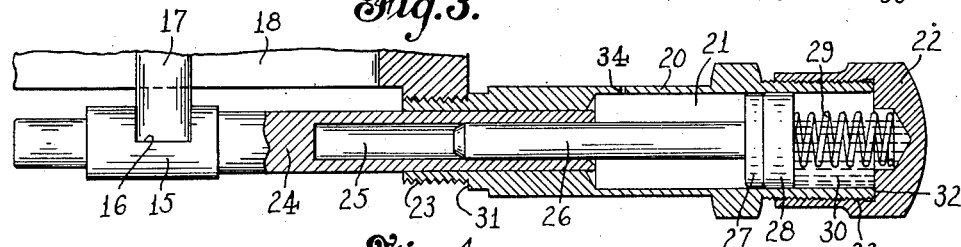
Figs. 3 and 4 are views similar to Fig. 2, but showing the parts in different positions.

As shown in Fig. 3 of the drawings, it may be assumed that the carriage slide has been advanced toward the left and the engagement of the pin 17 in the keyway 16 has moved the spring plunger 15 toward the left, compressing the spring 14. It will be noted that the portion 24 of the plunger has been moved away from the end of the stem 26 of the piston so that, while the piston is moved to some extent to the left by its spring and the pressure existing within the cylinder, it does not have a movement equal to the stroke of the carriage or the plunger 15 connected to the carriage.

Figure 2:
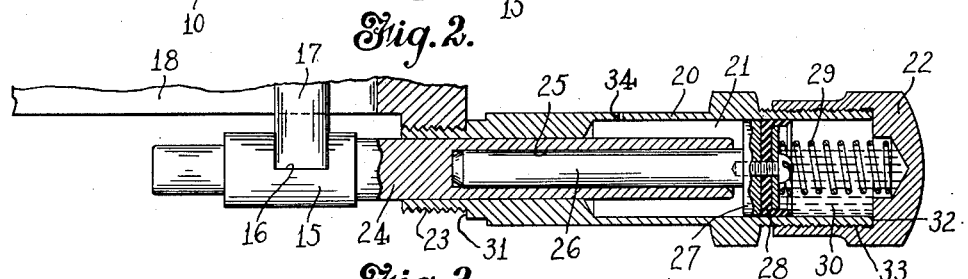
Fig. 2 is an enlarged sectional view of the cushioning device, showing certain of the associated part of the machine.

When the parts are in the position of Fig. 3, it may be assumed that the carriage is released and is free to be moved through its return stroke toward the right by the spring 14. The first part of this movement is shown at Fig. 2 wherein the plunger 15 has been moved to the right to a sufficient extent to cause the end of the stem 26 to bottom in the bore 25 of the plunger, thus being in a position to move the piston 27 toward the right upon further movement of the carriage.

The carriage continues its movement toward the right until the parts reach the position shown in Fig. 4. As the plunger 15 and piston 27 move from the positions shown in Fig. 3 to the positions shown in Fig. 4 it will be apparent that the air within the cylinder forwardly of the piston will be compressed, and as this is a relatively small amount of air it will be compressed within a relatively small space. Moreover, the oil will be displaced from the position shown in Fig. 2 to the position shown in Fig. 4 in which it substantially fills the space between the plunger 27 and cap 32. This will ordinarily be the final position of the parts, but even if the air should all escape from the cylinder, the oil or other liquid will serve to positively check the return of the slide and prevent the pin 17 from striking the edge of the slot 18 and being sheared off by the impact. The oil within the cylinder moreover acts as a seal and to a great extent prevents leakage of the air from the cylinder during the operation of the device. It will be apparent that if the oil were not present within the cylinder and if, for any reason, the pressure of the confined air were insufficient to check the return of the slide, breakage of the pin 17 would result. Such an accident, however, could not take place with the present device where the oil will serve as the final cushion to check the return of the carriage.

Figure 5:
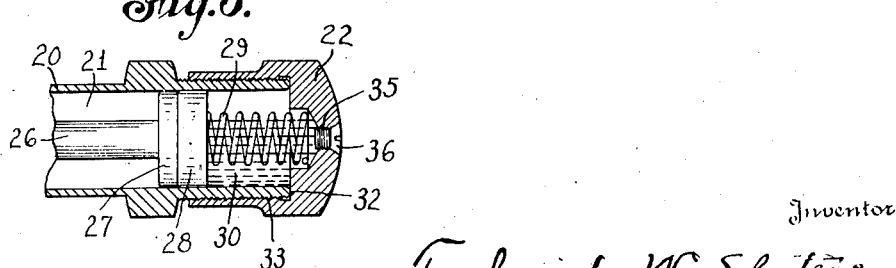
Fig. 5 is a fragmentary sectional view of a portion of the cushioning device showing a slight modification.

In Fig. 5 of the drawings, I have shown a slightly modified form of my device which may, in some instances, be preferable in that it provides a simple method of filling the cylinder with oil. In this form of my invention, the cap 22 may be screwed to its final position when the parts of the device are assembled. This cap is provided with an oil filler opening 35 closed by a screw 36 so that oil may be introduced into the cylinder after the cap 22 is in place. When the parts have been assembled, the piston 27 is moved to the position in which it is to be checked and thereafter the cylinder is filled with oil through the filler opening 35. The screw 36 is then inserted in order to close the opening and prevent loss of oil from the cylinder. As the level of the oil will at all times be above the screw 36, there will be no danger of leakage of air about the screw, but in any event the screw will make a substantially air- or liquid-tight seal. The operation of the device shown in Fig. 5 is, of course, similar to that of the modification shown in the other figures of the drawing, the only difference being in the method of introducing oil into the cylinder.

While I have shown and described some preferred embodiments of my invention, it will be understood that it is not to be limited to all of the details shown, but is capable of modification and variation within the spirit of the invention and within the scope of the claims.

What I claim is:

1. A cushioning device for the carriage slide of a machine tool having a spring to effect return movement of the slide, said device comprising a cylinder, a piston movable therein and having a rearwardly projecting stem, a plunger having a hollow portion telescoping over said stem, said plunger being slidably mounted in the rear end of the cylinder, and means connecting said plunger to the slide to move therewith.

2. A cushioning device for the carriage slide of a machine tool having a spring to effect return movement of the slide, said device comprising a cylinder, a piston movable therein and having a rearwardly projecting stem, a plunger having a hollow portion telescoping over said stem, said plunger being slidably mounted in the rear end of the cylinder, means connecting said plunger to the slide to move therewith, and a quantity of oil confined between the piston and the cylinder head.

3. A cushioning device for the carriage slide of a machine tool having a spring to effect return movement of the slide, said device comprising a cylinder, a piston movable therein and having a rearwardly projecting stem, a plunger having a hollow portion telescoping over said stem, said plunger being slidably mounted in the rear end of the cylinder and projecting therefrom, said spring acting upon said plunger, and means connecting said plunger to the slide to move therewith.

4. A cushioning device for the carriage slide of a machine tool having a spring to effect return movement of the slide, said device comprising a cylinder, a piston movable therein and having a rearwardly projecting stem, a plunger having a hollow portion telescoping over said stem, said plunger being slidably mounted in the rear end of the cylinder and projecting therefrom, said spring acting upon said plunger, means connecting said plunger to the slide to move therewith, and a liquid confined in the cylinder forwardly of the piston.

5. A cushioning device for the carriage slide of a machine tool having a spring to effect return movement of the slide, said device comprising a cylinder mounted upon a fixed part of the machine, said cylinder being open at one end and having a head at the other end, a piston in said cylinder having a stem projecting toward the open end thereof, a plunger slidably mounted in the open end of the cylinder and having a hollow end portion to telescope over said stem, means connecting said plunger to said slide to move therewith, said stem being of a length to bottom in said hollow portion of the plunger upon return of the slide by the spring and move the piston toward the head of the cylinder, and a liquid confined between the piston and the cylinder head.

6. A cushioning device for the carriage slide of a machine tool having a spring to effect return movement of the slide, said device comprising a cylinder mounted upon a fixed part of the machine, said cylinder being open at one end and having a head at the other end, a piston in said cylinder having a stem projecting toward the open end thereof, a plunger slidably mounted in the open end of the cylinder and having a hollow end portion to telescope over said stem, means connecting said plunger to said slide to move therewith, said stem being of a length to bottom in said hollow portion of the plunger upon return of the slide by the spring and move the piston toward the head of the cylinder, a liquid confined between the piston and the cylinder head, and a vent opening in said cylinder rearwardly of the piston.

7. A cushioning device for the carriage slide of a machine tool having a spring to effect return movement of the slide, said device comprising a cylinder mounted upon a fixed part of the machine, said cylinder being open at one end and having a head at the other end, a piston in said cylinder having a stem projecting toward the open end thereof, a plunger slidably mounted in the open end of the cylinder and having a hollow end portion to telescope over said stem, means connecting said plunger to said slide to move therewith, said stem being of a length to bottom in said hollow portion of the plunger upon return of the slide by the spring and move the piston toward the head of the cylinder, a liquid confined between the piston and the cylinder head, and the connecting means between said plunger and slide comprising a pin secured to the slide and engaged with the plunger.

8. A cushioning device for the carriage slide of a machine tool having a spring to effect return movement of the slide, said device comprising a cylinder mounted upon a fixed part of the machine, said cylinder being open at one end and having a head at the other end, a piston in said cylinder having a stem projecting toward the open end thereof, a plunger slidably mounted in the open end of the cylinder and having a hollow end portion to telescope over said stem, means connecting said plunger to said slide to move therewith, said stem being of a length to bottom in said hollow portion of the plunger upon return of the slide by the spring and move the piston toward the head of the cylinder, a liquid confined between the piston and the cylinder head, the connecting means between said plunger and slide comprising a pin secured to the slide and engaged with the plunger, a bed upon which the slide moves, said bed having a slot in which said pin moves, and said liquid in the cylinder preventing the pin from striking the rear edge of the slot.

FREDERICK W. SLATER.

REFERENCES CITED

The following references are of record in the file of this patent:

UNITED STATES PATENTS

| Number | Name | Date |
| --- | --- | --- |
| 1,030,832 | Riley | June 25, 1912 |
| 1,046,090 | Liebau | Dec. 3, 1912 |
| 1,553,804 | Cottrell | Sept. 15, 1925 |
| 1,671,074 | Hagmaier | May 22, 1928 |
| 1,819,414 | Gruss | Aug. 18, 1931 |
| 1,918,697 | Gruss | July 18, 1933 |
| 1,939,083 | Reussenzehn | Dec. 12, 1933 |
| 1,946,902 | Ferris | Feb. 13, 1934 |
| 2,357,505 | Crispell | Sept. 5, 1944 |

FOREIGN PATENTS

| Number | Country | Date |
| --- | --- | --- |
| 105,053 | Great Britain | Mar. 21, 1917 |